United States Patent [19]
Gysling

[11] Patent Number: 5,872,342
[45] Date of Patent: Feb. 16, 1999

[54] FREE ROTOR MUFFLER

[75] Inventor: Daniel L Gysling, Manchester, Conn.

[73] Assignee: Massachusetts Institute of Technology, Cambridge, Mass.

[21] Appl. No.: 692,324

[22] Filed: Aug. 5, 1996

Related U.S. Application Data

[63] Continuation of Ser. No. 247,947, May 24, 1994, abandoned.

[51] Int. Cl.⁶ .......................................... F01N 1/16
[52] U.S. Cl. ........................... 181/277; 181/279; 181/225
[58] Field of Search ................................... 181/225, 227, 181/228, 264, 274, 277, 278, 279, 213, 214, 219

[56] References Cited

U.S. PATENT DOCUMENTS

| | | | |
|---|---|---|---|
| 1,318,996 | 10/1919 | Hauman | 181/277 |
| 2,076,827 | 4/1937 | Ross | 181/225 |
| 2,172,713 | 9/1939 | Rutherford | 181/277 |
| 3,000,465 | 9/1961 | Bruno | 181/277 |
| 3,248,758 | 5/1966 | Mockridge et al. | |
| 3,856,333 | 12/1974 | Cox | |
| 5,129,792 | 7/1992 | Abousabha | 181/279 X |

FOREIGN PATENT DOCUMENTS

| | | |
|---|---|---|
| 683401 | 11/1952 | United Kingdom |
| 2066984 | 7/1981 | United Kingdom |

*Primary Examiner*—Khanh Dang
*Attorney, Agent, or Firm*—Steven J. Weissburg

[57] ABSTRACT

A free rotor is mounted to spin freely in a conduit network that is acoustically coupled to a noise source through a working fluid that flows through the conduit network. The free rotor muffles the acoustic perturbations travelling through the conduit network, thus effectively muffling the noise source. The network has at least one extent of conduit and within the extent of conduit. The free rotor is typically mounted with its axis of rotation parallel to the direction of flow of the working fluid. Additional free muffling rotors may be provided, either counter rotating or rotating in the same direction. If adjacent free rotors rotate in the same direction, it is beneficial to provide a stationary blade row between them. The multiple free rotors may be mounted on the same spindle, or mounted on independent spindles. The parameters of the free rotor are typically sized relative to the elements and environment of the conduit network such that:

$$f > \frac{\rho A u_x R^2}{2\pi J},$$

where J is the free rotor rotational inertia, R is the mean radius of the free rotor, $u_x$ is the axial velocity of fluid in the conduit, f is the lowest frequency of any acoustic vibration in the conduit to be muffled $\rho$ is the density of the working fluid, where $\pi$ is the ratio of the circumference of a circle to its diameter and A is the cross-sectional flow area of the free rotor.

22 Claims, 6 Drawing Sheets

FREE ROTOR MUFFLER

This application is a continuation of application Ser. No. 08/247,947 filed on May 24, 1994, now abandoned.

GOVERNMENT RIGHTS

The United States Government has certain rights in this invention pursuant to Contract/Grant No. AFOSR-91-0052, sponsored by the AFOSR.

BACKGROUND

The invention relates generally to the field of suppression of acoustic noise and relates more specifically to muffling acoustic noise in ducted or piped systems having a fluid flowing therethrough.

Systems having a volume flow throughput are common. They include: air-conditioning, heating and ventilating, steam power, internal combustion engines, vacuum cleaners, hair dryers, furnaces, gas turbines, positive displacement compressors, etc. Many of these systems share a common problem: they are acoustically noisy, and thus disturbing. The noise derives from perturbations in the fluid flowing through the ducting system at a frequency which gives rise to acoustic vibrations, i.e., vibrations within the audible range, of approximately 20 Hz to over 20 kHz.

The noise is a problem for many reasons. It is annoying to people who are near to the system. It may acoustically pollute an environment that requires relative quiet for other reasons, such as observation of acoustic phenomena. It renders it difficult for a vehicle including such a system to be used for surveillance, intelligence gathering, or other stealthy operations. It renders travel in such a vehicle unpleasant and degrades the enjoyment of any audio system carried thereby. The acoustic vibration may itself set off other vibrations at other parts in the system, which can mechanically disrupt elements in the system.

Figure 1:
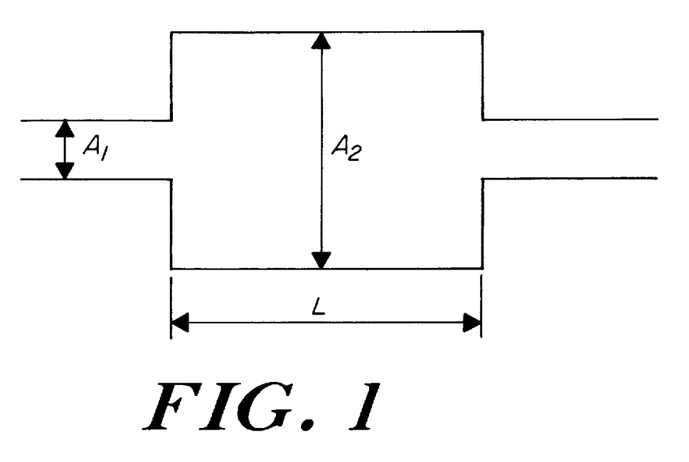
FIG. 1 is a schematic representation of a conventional expansion chamber muffler.

One type of conventional muffler, typically known as an "expansion" muffler, is shown schematically in FIG. 1. The transmission loss LT for an acoustic wave incident on an acoustic element is defined as:

$$L_T = \log_{10}\left(\frac{I_i}{I_t}\right), \quad (1)$$

where, $I_i$ is the intensity (in units of pressure times velocity) of an acoustic sound wave incident on the acoustic element and $I_t$ is the intensity of an acoustic sound wave transmitted through an acoustic element.

The transmission losses LT achieved by a conventional expansion chamber muffler, having an inlet (and exit) duct cross sectional area of $A_1$ and an expansion chamber cross sectional area of $A_2$ is given by:

$$L_T = 10\log_{10}\left[1 + \frac{1}{4}\left(\frac{1}{m} - m\right)^2 \sin^2\frac{\omega L}{c}\right], \quad (2)$$

where $m=A_2/A_1$, $\omega$=the frequency of the acoustic vibration, in radians per second, c is the speed of sound in the acoustic medium and L is the length of the expanded chamber.

Figure 2:
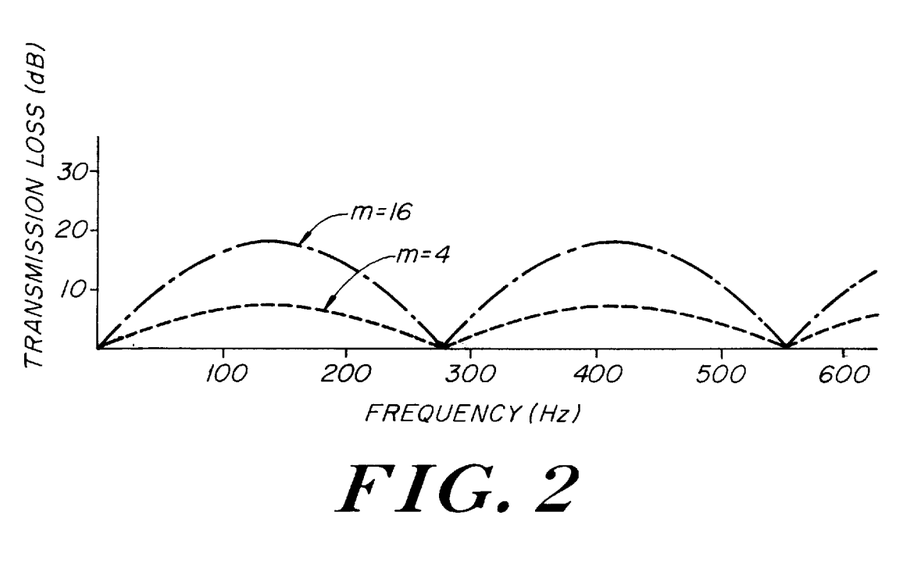
FIG. 2 is a graphical representation of the relation between transmission loss ratio and frequency for an expansion chamber muffler.

The relationship between the transmission loss (in dB) and the frequency of an acoustic sound wave for a typical expansion chamber type muffler is shown graphically in FIG. 2. Two different values for m are shown, with the generally upper trace being for m=16, and the lower trace for m=4. The other parameters used for FIG. 2 assume L=2 ft (0.61 m) and c=1100 ft/sec (279.4 m/sec), typical of atmospheric conditions. As is shown, with other things being equal, a larger m results in a relatively larger transmission loss.

Such an expansion muffler becomes ineffective at low frequencies, where the wave length ($\lambda=2\pi c/\omega$) of the acoustic oscillations is large compared to the length L of the resonator. In air at atmospheric conditions, the wavelength for a 10 Hz oscillation is approximately 100 ft. As such, a conventional muffler would have to be approximately 25 ft in length to muffle efficiently at this frequency.

This limitation makes the expansion chamber muffler impractical for attenuating low frequency noise in many applications, since the required dimensions of the muffler become prohibitively large. This limitation also limits the effectiveness of a Helmholtz resonator muffler for attenuating low frequency noise for the same reasons. As shown, the expansion chamber also becomes ineffective at frequencies equal to $n\pi c/L$, where n is an integer. For the case shown, these frequencies are multiples of 275 Hz.

Expansion and Helmholtz resonator mufflers also suffer from the problem of introducing a potentially undesirable pressure drop into the ducting or piping system in which they are installed. This results in a reduction in the efficiency or power delivery capabilities of the subject system.

Another undesirable feature of conventional type mufflers is the gradual slope of the transmission loss vs. frequency curve, between a zero transmission loss and the maximum transmission loss. This gradual slope means that there is a relatively large frequency range over which the transmission loss is less than the maximum. Such a situation is undesirable if the lowest desired frequency to be muffled is close to zero Hz. However, it is also not desirable that the transmission loss be at a maximum for a frequency range that extends all the way down to zero Hz.

It would be possible to muffle even low frequency noise (down to essentially 0 Hz) using a device such as a screen of an appropriate mesh. However, there is a relation between transmission loss at zero Hz and steady state pressure drop. Such a device would have a large pressure drop across it at steady state. This is undesirable.

A more desirable scenario, where the lowest frequency to be muffled is, in fact, very low, is where the transmission loss is zero for steady state and very low frequency perturbations, and also that the transmission loss abruptly rises from a low to a high value, transitioning from a low to a high transmission loss over a relatively small frequency range. As such, the curve relating transmission loss to frequency would substantially assume the form of a step function. In situations where the lowest frequency of noise desired to be muffled is not very low, it is not so important that the transition be abrupt.

Thus, an object of the invention includes to suppress a wide bandwidth of acoustic vibration in conduit systems, including but not limited to pipe or duct systems having a volume flow, including low frequency vibrations. It is a further object of the invention to suppress such vibrations with an apparatus that is not unduly large in the context of subject system. A further object of the invention is to suppress such vibration while minimizing the pressure drop across any muffling element or otherwise significantly reducing the efficiency or maximum power delivery capability of the system being silenced. Another object of the invention is to suppress noise with a device exhibiting a transmission loss to frequency relation that has a minimal or zero transmission loss at frequencies near steady state, and a transition to a high transmission loss. In some circumstances, it may be desirable that the transition from zero to high transmission loss approximate a step function, encompassing a relatively narrow range of frequencies.

SUMMARY

In general, an embodiment of the invention is a free rotor, mounted to spin freely in a conduit network that is acoustically coupled to a noise source through a working fluid that flows through the conduit network. The free rotor reflects the acoustic perturbations travelling through the conduit network, thus effectively muffling the noise source from an observer located on the opposite side of the free rotor from the noise source.

More specifically, a first preferred embodiment of the invention is a conduit network for use with a working fluid flowing therethrough. The network comprises at least one extent of conduit and within the extent of conduit, at least one muffling free rotor, mounted to spin freely about an axis during steady state flow of the working fluid through the conduit. The free rotor is typically mounted with its axis of rotation parallel to the direction of flow of the working fluid. Additional free muffling rotors may be provided, either counter rotating or rotating in the same direction. If adjacent free rotors rotate in the same direction, it is beneficial to provide a stationary blade row between them. The multiple free rotors may be mounted on the same spindle, or mounted on independent spindles.

In another preferred embodiment of the invention, the parameters of the free rotor are sized relative to the elements and environment of the conduit network such that:

$$f \gg \frac{\rho A u_x R^2}{2\pi J},$$

where J is the free rotor rotational inertia, R is the radius of the free rotor, $u_x$ is the axial velocity of the fluid in the conduit, f is the lowest frequency of any acoustic vibration in the conduit to be muffled, $\rho$ is the density of the working fluid, $\pi$ is the ratio of the circumference of a circle to its diameter and A is the cross-sectional flow area of the free rotor.

In yet another preferred embodiment of the invention, the free rotor has a blade row with blades with a stagger angle set to establish a rotor tip speed of greater than or equal to Mach 0.2.

According to yet another preferred embodiment, the invention is a muffled apparatus comprising an acoustic vibration source and a conduit network for use with a working fluid flowing therethrough. The working fluid is acoustically coupled with the vibration source and the conduit network includes at least one extent of conduit. Within the extent of conduit at least one muffling free rotor is mounted to spin freely about an axis during steady state flow of the working fluid through the conduit. The free rotor may be arranged and sized as described above.

Preferred embodiments of the muffled apparatus include internal combustion engines, vacuum devices, hydraulic pumps, positive displacement compressors and turbo machines.

Another aspect of the invention is a method of muffling a noise source, comprising the steps of providing a free rotor as described above and allowing the free rotor to rotate freely in the working fluid.

BRIEF DESCRIPTION OF THE DRAWINGS

These and other features, aspects, and advantages of the present invention will become better understood with regard to the following description, appended claims and accompanying drawings, where:

DETAILED DISCUSSION

The invention is useful in any application where there is unwanted acoustic perturbations, i.e. noise, within a conduit system, such as ducting or piping and where a low pressure drop is required. The invention works equally well in to any conduit system, such as ducts, pipes or channels, and any other system having a volume flow rate. The following discussion is general in nature and refers to a conduit system, contemplating any of the foregoing, and any system using conduits, channels, ducts, pipes, etc.

According to one embodiment, the invention is a free rotor interposed in the conduit system, which reduces the transmission of sound waves along the length of the conduit system. The apparatus achieves high levels of acoustic transmission loss over a large frequency range, while causing only a minimum steady state power loss or pressure drop.

Figure 3:
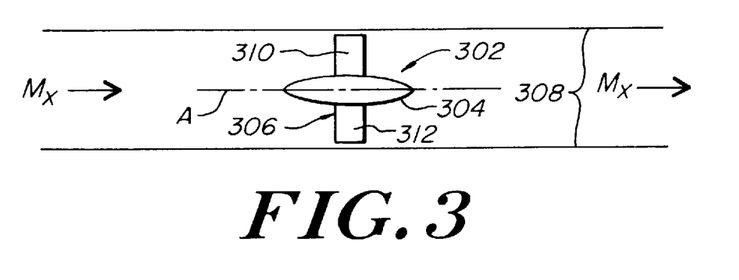
FIG. 3 shows schematically an embodiment of the invention with a single free rotor muffler mounted in a conduit.

A free rotor 302 is shown schematically mounted within a stretch of conduit 308. A fitting 314 is provided to mechanically couple the conduit to a duct that is acoustically coupled (by fluid flowing therethrough) to an acoustic vibration noise source 320. The free rotor 302 consists of a hub 304 and a blade row 306 of individual blades 310, 312 and others not shown. The invention works well for free rotors having any hub-to-tip ratio. It works best for stagger angles $\gamma$ that establish a rotational speed that results in a Mach number of greater than or equal to Mach 0.2. That is, the ratio of the rotor tip speed to the speed of sound in the fluid is greater than or equal to 0.2. (The Mach number is referred to below as $M_r$.) The hub 304 is centered in the conduit and the free rotor is free to rotate about the hub, rotating around the axis A as shown.

The camber and twist are designed, according to known principles, to minimize steady state losses through the free rotor, and facilitate fabrication. Typically, low twist and no camber is expected to provide beneficial results. The mean stagger angle γ (averaged over span of blade) of the rotor, as shown schematically in FIG. 5, for a desired level of acoustic attenuation, is set by the design considerations set forth below.

Figure 5:
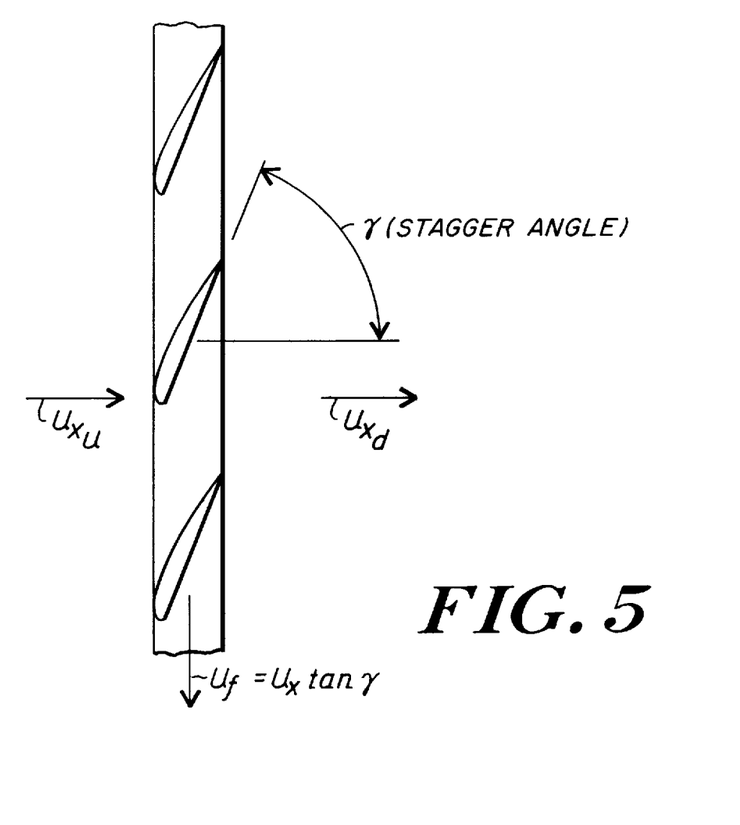
FIG. 5 shows schematically the stagger angle of a free rotor blade.

At steady state conditions, the free-rotor rotates at a speed at which the mean pressure difference across the free rotor is essentially zero. There is a slight pressure drop across the free rotor due to flow losses, such as boundary layer friction, induced drag, etc. The free rotor angular velocity Ω is set by the stagger angle γ of the blades on the rotor and by the mean axial velocity $U_x$ of volume flow of the fluid through the ducting, according to the following expression:

$$\Omega R = u_f = u_x \tan\gamma, \quad (3)$$

where R is the radius of the free rotor from the axis of rotation to the midpoint of the span of the blades, and $u_f$ is the tangential velocity of the free rotor (at its mean radius). This description is a "meanline" description, where the aerodynamics are assessed at a mean radius defined as the average of the hub and tip radius (both measured from the central hub axis radius). Such a description is simplified, for purposes of discussion.

For acoustic perturbations that occur on time scales that are short compared to the time scale of the free rotor (the time required for the rotational speed of the free rotor to adjust to the new equilibrium which free rotor time scale is governed by the rotational inertia of the free rotor and by its aerodynamic parameters), the rotational speed of the free-rotor remains essentially constant. Identification of the types of situations under which such time scales hold is made below. Thus, the free rotor behaves as a constant speed rotor. For a constant speed rotor (with blade solidity (blade chord/blade spacing) on the order of one (ranging from 0.1 to 10.0)) experiencing flow perturbations such as those associated with acoustic oscillations, the relation between pressure rise across the rotor and volume flow rate through the rotor (accurate to the first order) is given by:

$$\delta P_{s_u}\left(1 + \frac{1}{2} M_x^2 + \frac{1}{2} M_f^2\right) + M_x \rho c \delta u_{x_u} = \quad (4)$$

$$\delta P_{s_d}\left(1 + \frac{1}{2} M_x^2 + \frac{1}{2} M_f^2\right) + M_x \rho c \delta u_{x_d} + \frac{M_f^2}{M_x} \rho c \delta u_{x_d}$$

where M represents the Mach number, ρ is the density of the fluid, P is the pressure, δ is a perturbation quantity, the subscript s represents static pressure, the subscript f represents the free rotor, the subscript x represents the axial direction, c is the speed of sound in the fluid, and the subscripts u and d denote conditions upstream and downstream of the free rotor, respectively. The Mach number $M_x$ is $u_x/c$ and $M_f$ is $u_f/c$.

Continuity requires the mass flow to be continuous across the free-rotor. Using this and Eq. (4) yields the relationship between axial velocity perturbations across the free rotor:

$$\rho c \delta u_u = \frac{1}{1 + M_f^2} \rho c \delta u_d \quad (5)$$

Using these relations, the acoustic transmission matrix for the free-rotor, relating the acoustic perturbations upstream of the free rotor to those downstream of the free rotor, can be assembled as follows:

$$\begin{Bmatrix} \delta P_{s_u} \\ \rho c \delta u_{x_u} \end{Bmatrix} = \begin{bmatrix} T_{11} & T_{12} \\ T_{21} & T_{22} \end{bmatrix} \begin{Bmatrix} \delta P_{s_d} \\ \rho c \delta u_{x_d} \end{Bmatrix}$$

$$= \begin{bmatrix} 1 & \dfrac{M_f^2}{M_x\left(1 - \frac{1}{2} M_x^2 + \frac{1}{2} M_f^2\right)} \\ 0 & 1 - \dfrac{M_f^2}{\left(1 - \frac{1}{2} M_x^2 + \frac{1}{2} M_f^2\right)} \end{bmatrix} \begin{Bmatrix} \delta P_{s_d} \\ \rho c \delta u_{x_d} \end{Bmatrix}$$

where $T_{ij}$ is an element in the acoustic transmission matrix as defined above.

As a preliminary example, for simplicity, where $M_x^2 M_f^2 \ll 1$, the ratio between the intensity $I_t$ of a sound wave transmitted through an acoustic element and the intensity $I_i$ of a sound wave incident on the free rotor is given by:

$$\frac{I_t}{I_i} = \frac{4}{|T_{11} + T_{12} + T_{21} + T_{22}|^2} \approx \frac{4}{\left|2 + \dfrac{M_f^2}{M_x}\right|^2}. \quad (7)$$

Given the transmission matrix for an acoustic element, the transmission loss $L_T$ (dB) for an acoustic wave incident on the acoustic element is given by:

$$L_T = 10\log_{10}\left(\frac{I_i}{I_t}\right) = 10\log_{10}\left(\frac{\left|2 + \dfrac{M_f^2}{M_x}\right|^2}{4}\right). \quad (8)$$

Thus, the transmission loss due to the free rotor can be calculated for various system parameters. The following tables show the predicted transmission loss across the free rotor for various free rotor muffler parameters.

TABLE 1

($M_x = .05$)

| $M_x$ | $M_f$ | $\gamma_f$ | $L_T$ (dB) |
|---|---|---|---|
| .05 | 0.1 | 63° | 0.8 |
| .05 | 0.3 | 80° | 5.5 |
| .05 | 0.5 | 85° | 10.9 |
| .05 | 0.7 | 86° | 15.4 |

TABLE 2

($M_f = 0.7$)

| $M_x$ | $M_f$ | $\gamma_f$ | $L_T$ (dB) |
|---|---|---|---|
| .01 | 0.7 | 89° | 28.2 |
| .05 | 0.7 | 86° | 15.4 |
| .1 | 0.7 | 82° | 10.8 |
| .2 | 0.7 | 74° | 6.9 |

Figure 4:
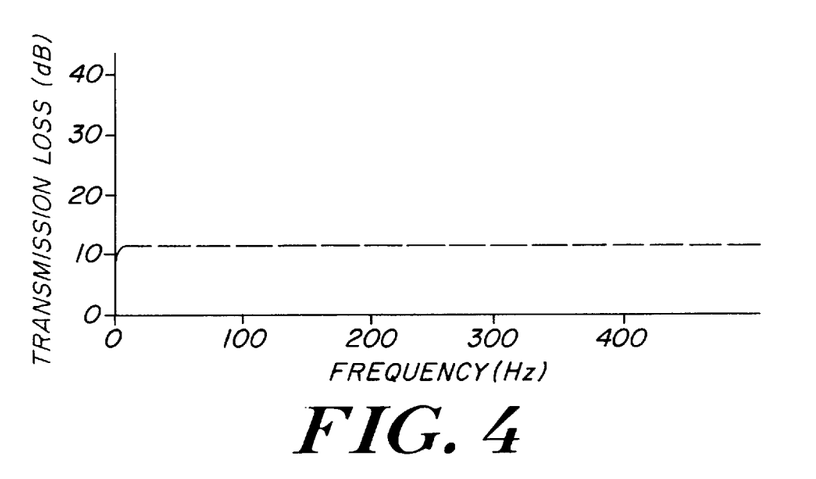
FIG. 4 is a graphical representation of the relation between transmission loss ratio and frequency for a muffler according to an embodiment of the invention.

The relation between $L_T$ and frequency, for a free rotor with $M_f=0.7$, γ=0.82° and $M_x=0.1$ is shown substantially in FIG. 4. This $L_T$ of essentially a constant 10.8 for frequencies down to 1 Hz compares favorably for that of a conventional muffler, as shown in FIG. 2, which is much lower for such low frequencies. For instance, for m=16, the transmission loss LT is below 10 for frequencies below 50 Hz. For m=4, the transmission loss never rises to 10.

Further, the transmission loss vs. frequency curve exhibits the desirable shape of having a zero transmission loss at zero Hz and a significant transmission loss at a preselected higher frequency. In this particular case, the curve substantially approximates a step function, with a relatively abrupt transition from zero transmission loss at zero frequency, up to a maximum transmission loss, over a relatively narrow frequency range of only one Hz. The sharp transition is not necessary, as long as the zero transmission loss at zero Hz and adequate transmission loss at a suitable higher frequency is achieved. However, if the lowest frequency desired to be muffled is indeed very low, then a step transition is highly desirable.

Figure 10:
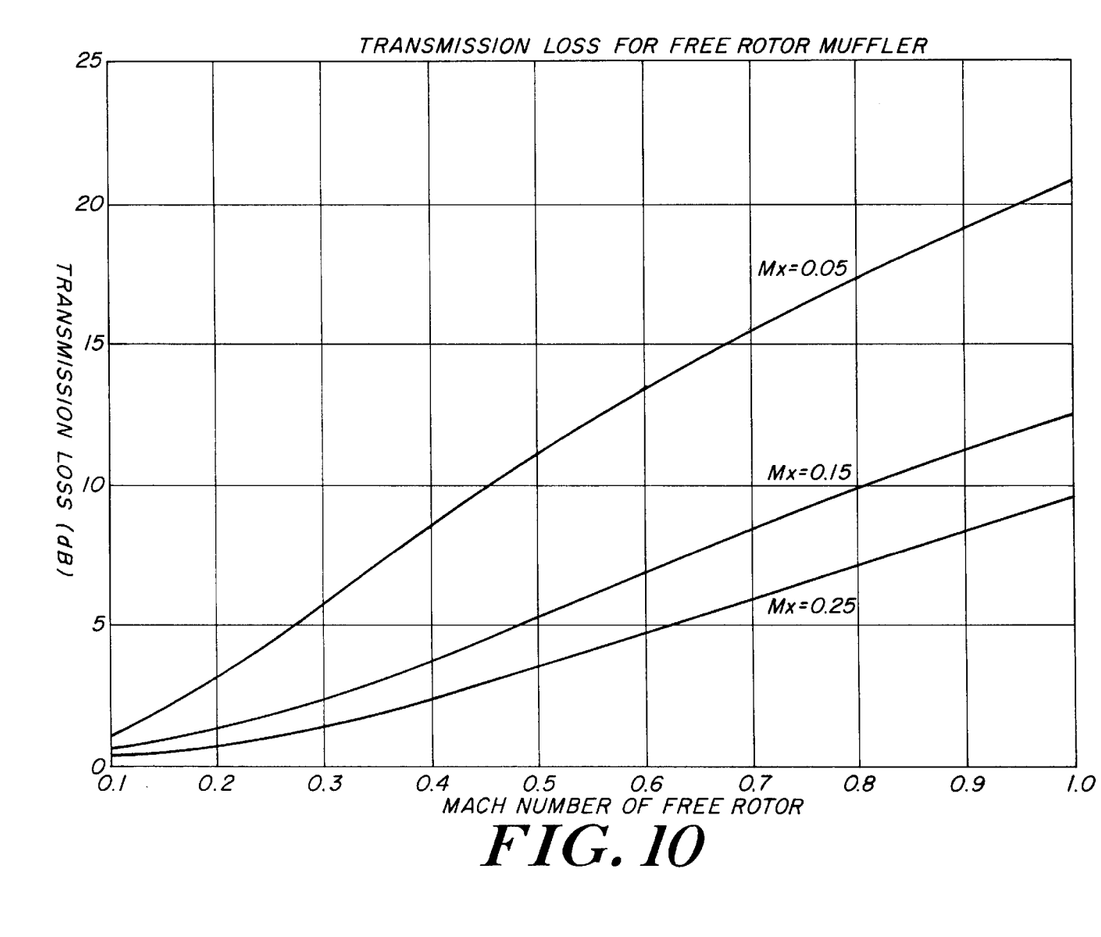
FIG. 10 shows schematically the transmission loss predicted by Eq. (8) for a single free rotor muffler as a function of free rotor rotational Mach number.

FIG. 10 shows schematically a family of curves predicted by Eq. (8) relating the constant transmission loss to the Mach number for the rotational speed of the rotor $M_f$. Each member of the family is for a different axial Mach number for the mass through flow $M_x$. (The transmission loss is constant, above the transition range of frequencies. For instance, in FIG. 4, this constant transmission loss is approximately 10.8.)

FIG. 10 shows that for a given axial mach number $M_x$, as $M_f$ ranges from high to low, so does the transmission loss $L_T$. FIG. 10 also shows that for a given free rotor Mach number $M_f$, as the axial Mach number $M_x$ of the fluid through the free rotor ranges from low to high, the transmission loss $L_T$ ranges from high to low The transmission loss of the free rotor muffler can be compared to the transmission losses achieved by a conventional expansion chamber muffler, as set forth above. As pointed out above, most conventional mufflers, such as an expansion muffler, become ineffective at low frequencies, where the wave length of the acoustic oscillations is large compared to the length of the resonator and at integral multiples of half wave lengths. As is well known, for the non-zero frequency multiples, one can use combinations of conventional mufflers to muffle all relatively high frequencies by picking the size so that the upper harmonics do not coincide. However, it is not possible to use this technique to muffle the low frequencies, since there is always a minima of effectiveness near zero frequency. This limitation makes the expansion chamber muffler impractical for attenuating low frequency noise in many applications, since the required dimensions of the muffler become prohibitively large. This limitation also limits the effectiveness of a Helmholtz resonator muffler for attenuating low frequency noise for the same reasons.

There are at least three distinct advantages of the free rotor muffler over conventional expansion chambers and resonator mufflers. First, the free rotor muffler can attenuate low frequency noise independent of the physical size of the free rotor. Second, the free rotor is capable of broad band attenuation, over a large frequency range. Third, the free rotor offers high acoustic transmission loss down to much lower frequencies than conventional mufflers and also may be designed to have an abrupt transition over which the transmission loss ranges from a high value to essentially zero. The designer can establish the frequency of this transition over a wide range, typically choosing a very low frequency. The value of the acoustic transmission loss at zero frequency is closely related to the steady state pressure drop across the device. It is desirable that this steady state pressure drop be minimized. Because the invention allows precisely controlling the frequency range of the transition for high to low transmission loss and also allows establishing that transition at a very low frequency, the invention provides for muffling of acoustic noise at low frequency without imposing a steady state pressure loss.

By definition, the transmission loss of the free rotor approaches zero in the limit of low frequency oscillations. The detailed low frequency response of the free rotor is governed by the aerodynamic properties of the free rotor and the rotational inertia of the free rotor. For the assumption of constant free rotor speed to be realistic, the acoustic perturbations must occur on time scales that are short compared to the time required for acceleration of the free rotor. This is expressed by the following relation, among the free rotor inertia system parameters and the lowest acoustic frequency to be attenuated:

$$\omega = 2\pi f > \frac{\rho A u_x}{J/R^2} \sim \frac{\dot{m}}{m_f}, \qquad (9)$$

where J is the free rotor rotational inertia, f is the lowest frequency in Hertz of the acoustic perturbations sought to be muffled, $m_f$ is the mass of the free rotor, m is the mass flow rate of fluid in the duct, R is the mean radius of the free rotor, $\rho$ is the density of the fluid and A is the area of the flow through the free rotor (typically an annular region). For frequencies below this value (f), the acoustic oscillations will significantly affect free rotor speed, and the free rotor will become ineffective in attenuating sound. For anticipated applications, the frequency at which the free rotor begins to lose attenuation capability in air will be on the order of 1 Hertz. Thus, as a general rule, a free rotor having a higher inertia will be more effective at muffling lower frequency noise than a free rotor having a lower inertia, other things being equal.

The present invention works in connection with any hub-to-tip ratio. The foregoing discussion used as an illustration the case where the mass flow rate and the free rotor speeds are such that $M^{x2}$ and $M_f^2$ are much less than 1. This assumption was made only to simplify the discussion, as, in that case, the transmission matrix is very simple. However, the free rotor also acts effectively as an acoustic muffler in situations where neither $M_x^2$ nor $M_f^2$ are much less than 1. However, in such cases, evaluation of the transmission matrix is more involved mathematically. Such evaluation is, however, within the competence of one ordinarily skilled in the art.

The foregoing analysis is based on certain assumptions. As with any acoustic element, the actual insertion loss (as opposed to transmission loss used in the above discussion) depends on acoustic parameters of the overall system in which the element resides. (This is also true of conventional mufflers.) Thus, in order to apply and evaluate the effect of the present invention, the acoustic parameters of the actual system into which the free rotor is to be installed must be addressed to achieve optimal attenuation of undesired acoustic oscillation. Such evaluation is within the competence of one of ordinary skill in the art of acoustic engineering.

It has been demonstrated that the free rotor is more effective as a muffler, other things being equal, for higher Mach numbers $M_f$ for the tip speed of the free rotor. Therefore, for a given axial flow rate Mach number $M_x$, higher blade stagger angles provide better muffling results. Typically, beneficial results can be achieved with stagger angles greater than 45°.

The foregoing discussion pertains to a basic configuration with a single free rotor acting as the muffling element. A higher transmission loss can be achieved by using additional free rotors. The additional rotor(s) can be mechanically independent, or can be linked by a common shaft, or there can be a combination, with some rotors being independent and some being linked. It is important that free rotors that are closely spaced (i.e. within one free rotor diameter from each other) that rotate in the same direction, must be separated by either a stationary blade row, or a counter rotating rotor.

Counter rotating free rotors can be arranged adjacent each other independent of that axial spacing.

Figure 6:
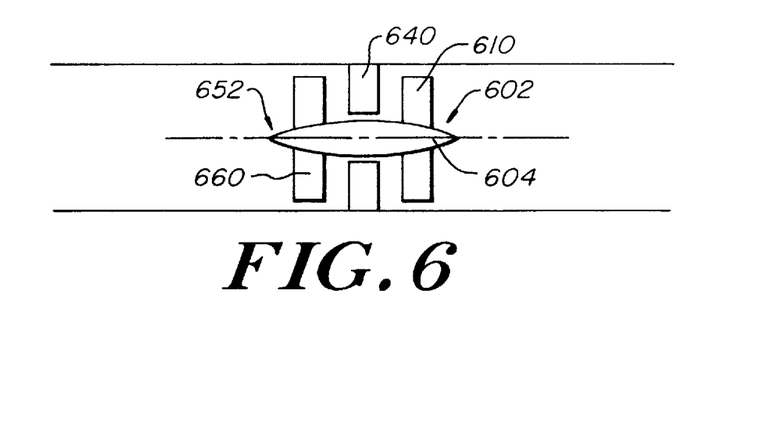
FIG. 6 shows schematically an embodiment of the apparatus of the invention with a pair of free rotors mounted on a common shaft in a conduit or pipe and with a stationary blade row between the two free rotors.
Figure 7:
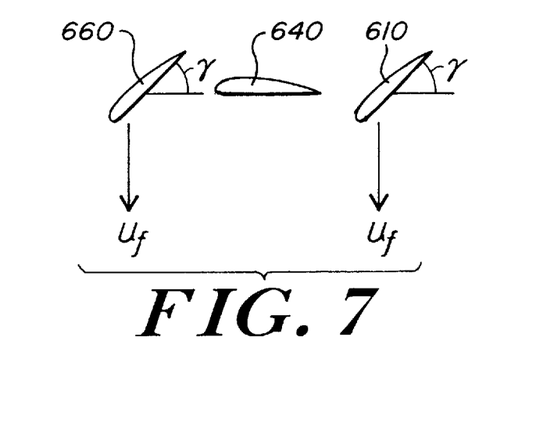
FIG. 7 shows schematically the blade angle arrangement for an embodiment of the apparatus of the invention having a number N of free rotors mounted on a rotating spool, with N−1 stationary blade rows there between, such as is shown in FIG. 6 for N=2.

FIG. 6 shows schematically a pair of free rotors 602 and 652 that rotate in the same direction and share a common spindle 604. Free rotor 602 carries a blade row 610 and free rotor 652 carries a blade row 660. A stationary blade row 640 is interposed between the two free rotor blade rows. The relation between the stagger angles γ for each of the free rotors 602 and 652 is shown schematically in FIG. 7, where it can be seen that they are equal. If the blade rows are mounted on the same spindle, the stagger angles must be equal. There need not be the same number of blades on each rotor. If the free rotors are not mounted on a common spindle, but are arranged to rotate in the same direction, they may have different stagger angles and different rotation rates.

As an example, for an arrangement of one rotating spool, carrying N rotating blade rows all at the same stagger angle (FIG. 6 shows the situation for N=2), and with N−1 stationary blade rows, the transmission loss $L_T$ is as follows:

$$L_T \cong 10 \log_{10} \left( \frac{\left| 2 + N \frac{M_f^2}{M_x} \right|^2}{4} \right), \quad (10)$$

with $M_x^2, M_f^2 \ll 1$ as before (to simplify analysis but not to be considered a restriction on the arrangement of the invention). Thus, additional free rotors increase the transmission loss.

Figure 8:
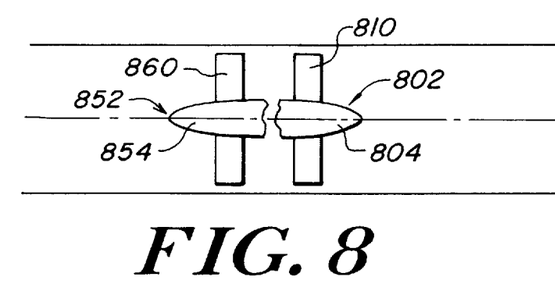
FIG. 8 shows schematically an embodiment of the apparatus of the invention with a pair of free rotors mounted on separate shafts.
Figure 9:
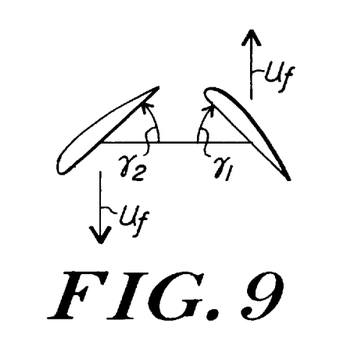
FIG. 9 shows schematically the blade angle arrangement for the embodiment of the invention shown in FIG. 8, resulting in counter-rotating free rotors.

FIG. 8 shows schematically a pair of free rotors 802 and 852 that rotate in opposite directions, each on their own spindle 804 and 854, respectively. Free rotor 802 carries a blade row 810 and free rotor 852 carries a blade row 860. The relation between the stagger angles $\gamma_1$ and $\gamma_2$ for each of the free rotors 802 and 852 is shown schematically in FIG. 9, where it can be seen that they are opposite to each other. The stagger angles need not be equal in magnitude. There can be fewer blades in one row, and/or with a different angle. They may have different stagger angles and different rotation rates.

As an example, for an arrangement of N counter-rotating spools, each carrying a single rotating blade row (FIG. 8 shows the situation for N=2), the transmission loss $L_T$ is as follows:

$$L_T \cong 10 \log_{10} \left( \frac{\left| 2 + (2N-1) \frac{M_f^2}{M_x} \right|^2}{4} \right), \quad (11)$$

with $M_x^2, M_f^2 \ll 1$ as before. Thus, additional free rotors again multiply the transmission loss. Comparison to the situation with multiple free rotors on a common spindle, rotating in the same direction, shows that the counter rotating configuration provides a generally higher transmission loss per additional rotor.

The principles regarding the attenuation for multiple blade row configurations is the same as that for a single freerotor. The advantage of multiple blade row configurations is that a significant increase in attenuation can be achieved for a given free rotor tip speed.

Figure 11:
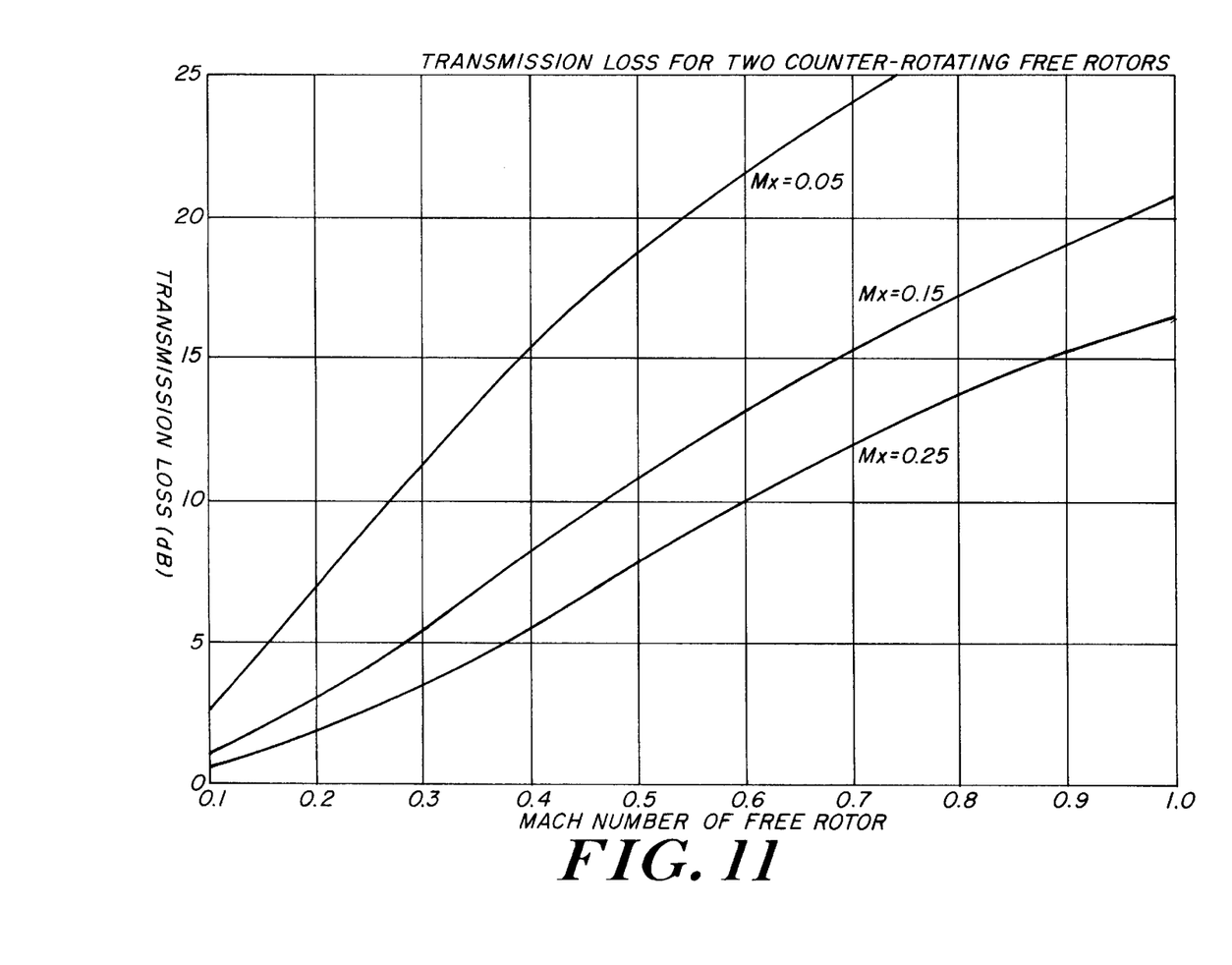
FIG. 11 shows schematically the transmission loss predicted by Eq. (11) for two counter rotating free rotors as a function of free rotor rotational Mach number.

FIG. 11 shows a family of curves predicted by Eq. (11) for two counter rotating free rotors, similar to the family of curves shown in FIG. 10. The trends are the same as those for the single free rotor. However, the counter rotating muffler provides a higher transmission loss for a given set of axial and rotational Mach numbers. Hence, the counter rotating free rotor can achieve equivalent transmission loss at lower free rotor rotational speeds.

The invention can be used in any system having a volume flow rate. The flowing volume can be a gas, liquid, or a combination thereof, such as a steam system. Any number of free rotors can be included in the system. The ducting may be large or small in cross-sectional dimensions and in length. The free rotor must be between the noise source and the observer, and can be upstream or downstream (relative to the fluid motion) of the noise source of vibration. The acoustic vibrations move relative to fluid flow in both directions. (The noise vibrations also travel in the duct material itself. This structurally borne noise is not addressed by the present invention.)

Another aspect of the invention is a method of muffling acoustic noise. The method includes the steps of coupling a duct network to a source of acoustic noise through a working fluid that is acoustically coupled to the noise source and that flows through the duct network. The method further includes the step of mounting a free rotor, as described above, in the duct network.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The free rotor muffler may be used in connection with internal combustion machines, other turbo machinery, vacuum devices, blowers such as hair dryers and leaf blowers, furnaces, gas turbines, positive displacement compressors, etc., where an acoustic vibration source is acoustically coupled with a fluid in a pipe or duct or conduit network. The network may be a network of only a single extent of conduit.

Having described the invention, what is claimed is:

1. A muffling conduit network for use with a working fluid flowing therethrough, said network comprising:
   a. at least one extent of conduit: and
   b. within said extent of conduit, at least one muffling free rotor, mounted to spin freely about an axis during steady state flow of said working fluid through said conduit, said free rotor comprising:
      i. a hub, having a radius measured from said axis; and
      ii. extending from said hub, a blade row of a plurality of substantially equal length blades, each blade having:
         A. a leading edge and a trailing edge, said flow of working fluid passing from said leading edge to said trailing edge, and a stagger angle between said axis and a line connecting said leading and said trailing edge; and
         B. a tip and a radius, measured from said axis to the blade's tip;
   said blade row comprising blades with stagger angles that result in a rotor blade tip speed of greater than or equal to Mach 0.2 for the mean axial velocity of volume flow of said working fluid through said conduit under steady state operating conditions.

2. The conduit network of claim 1, said free rotor mounted such that it spins in a plane generally perpendicular to the direction of flow of said working fluid.

3. The conduit network of claim 1, said axis about which said free rotor spins aligned generally with the direction of flow of said working fluid.

4. The conduit network of claim 1, further comprising at least one additional muffling free rotors.

5. The conduit network of claim 4, two adjacent of said muffling free rotors having a stagger angle of their respective blades arranged to rotate the respective free rotors in directions opposite each other when driven by an axial flow of working fluid through each.

6. The conduit network of claim 4, two adjacent of said muffling free rotors having a stagger angle of their respective blades arranged to rotate the respective free rotors in the same direction as each other when driven by an axial flow of working fluid through each.

7. The conduit network of claim 4, further comprising a spindle that is coaxial with said axis, upon which at least two of said muffling free rotors are fixed.

8. The conduit network of claim 1, said blade row comprising blades with substantially no camber.

9. A muffling conduit network for use with a working fluid flowing therethrough, said network comprising:
 a. at least one extent of conduit; and
 b. within said extent of conduit, at least one muffling free rotor, mounted to spin freely about an axis during steady state flow of said working fluid through said conduit, said free rotor comprising:
  i. a hub, having a radius measured from said axis; and
  ii. extending from said hub, a blade row of a plurality of substantially equal length blades, each blade having a tip and a radius, measured from said axis to the blade's tip;
 said free rotor being constructed such that:

$$f > \frac{\rho A u_x R^2}{2\pi J},$$

where J is the free rotor rotational inertia, R is the mean of the radius of said hub and the radius of one of said blade tips of the free rotor, $u_x$ is the axial velocity of fluid in the conduit, f is the lowest frequency of any acoustic vibration in the conduit to be muffled, A is the cross-sectional flow area at the axial location of the free rotor, $\rho$ is the density of the working fluid and $\pi$ is the ratio of the circumference of a circle to its diameter.

10. A muffling conduit network for use with a working fluid flowing therethrough, said network comprising:
 a. at least one extent of conduit;
 b. within said extent of conduit, at least two muffling free rotors, mounted to spin freely about an axis during steady state flow of said working fluid through said conduit, each said free rotor comprising:
  i. a hub, having a radius measured from said axis;
  ii. extending from said hub, a blade row of a plurality of substantially equal length blades, each blade having:
   A. a leading edge and a trailing edge, said flow of working fluid passing from said leading edge to said trailing edge, and a stagger angle between said axis and a line connecting said leading and said trailing edge; and
   B. a tip and a radius, measured from said axis to the blade's tip; and
  iii. two adjacent of said muffling free rotors having a stagger angle of their respective blades arranged to rotate the respective free rotors in the same direction as each other when driven by an axial flow of working fluid through each; and
 c. a stationary blade row between said two free rotors arranged to rotate in the same direction as each other.

11. A muffled apparatus comprising:
 a. an acoustic vibration source; and
 b. a conduit network arranged such that a working fluid flowing therethrouah that is acoustically coupled with said vibration source, acoustically couples said acoustic vibration source to said conduit network, said conduit network comprising:
  i. at least one extent of conduit; and
  ii. within said extent of conduit, at least one muffling free rotor, mounted to spin freely about an axis during steady state flow of said working fluid through said conduit, said free rotor comprising:
   (A). a hub, having a radius measured from said axis; and
   (B). extending from said hub, a blade row of a plurality of substantially equal length blades, each blade having a tip and a radius measured from said axis to the blade's tip;
  said free rotor being constructed such that:

$$f > \frac{\rho A u_x R^2}{2\pi J},$$

where J is the free rotor rotational inertia, R is the mean of the radius of the hub and the radius of one of the blade tips of the free rotor, $u_x$ is the axial velocity of fluid in the conduit, f is the lowest frequency of any acoustic vibration in the conduit to be muffled, A is the cross-sectional flow area at the axial location of the free rotor, $\rho$ is the density of the working fluid and $\pi$ is the ratio of the circumference of a circle to its diameter.

12. A muffled apparatus comprising:
 a. an acoustic vibration source; and
 b. a conduit network arranged such that a working fluid flowing therethrouah, that is acoustically coupled with said vibration source, acoustically couples said acoustic vibration source to said conduit network, said conduit network comprising:
  i. at least one extent of conduit; and
  ii. within said extent of conduit, at least one muffling free rotor, mounted to spin freely about an axis during steady state flow of said working fluid through said conduit, said free rotor comprising:
   (A). a hub, having a radius measured from said axis; and
   (B). extending from said hub, a blade row of a plurality of substantially equal length blades, each blade having:
    I. a leading edge and a trailing edge, said flow of working fluid passing from said leading edge to said trailing edge, and a stagger angle between said axis and a line connecting said leading and said trailing edge; and
    II. a tip and a radius measured from said axis to the blade's tip;
   said blade row comprising blades with stagger angles that result in a rotor blade tip speed of greater than or equal to Mach 0.2 for the mean axial velocity of volume flow of working fluid through said conduit under steady state operating conditions.

13. The apparatus of claim 12, said vibration source comprising an internal combustion engine.

14. The apparatus of claim 12, said vibration source comprising a vacuum device.

15. The apparatus of claim 12, said vibration source comprising a turbo machine.

16. The apparatus of claim 12, said vibration source comprising a positive displacement compressor.

17. The apparatus of claim 12, further comprising at least one additional muffling free rotors.

18. A method for muffling acoustic perturbations in a network of at least one extent of conduit, having a working fluid flowing therethrough, comprising the steps of:
 a. providing at least two free rotors within said at least one extent of conduit, each said free rotor comprising:
  i. a hub, having a radius measured from said axis: and
  ii. extending from said hub, a blade row of a plurality of substantially equal length blades, each blade having a tip and a radius, measured from said axis to the blade's tip; and
 b. arranging each said free rotor freely rotatably in said conduit such that two adjacent of said free rotors rotate in the same direction as each other and providing a stationary blade row between said two adjacent free rotors.

19. A method for muffling acoustic perturbations in a network of at least one extent of conduit. having a working fluid flowing therethrough, comprising the steps of:
 a. providing at least one free rotor within said at least one extent of conduit, said free rotor comprising:
  i. a hub, having a radius measured from said axis; and
  ii. extending from said hub, a blade row of a plurality of substantially equal length blades, each blade having a tip and a radius, measured from said axis to the blade's tip:
 b. constructing said free rotor such that:

$$f > \frac{\rho A u_x R^2}{2\pi J},$$

where J is the free rotor rotational inertia, R is the mean radius of the free rotor, $u_x$ is the axial velocity of fluid in the conduit, f is the lowest frequency of any acoustic vibration in the conduit to be muffled and A is the cross-sectional flow area at the axial location of the free rotor, $\rho$ is the density of the working fluid and where $\pi$ is the ratio of the circumference of a circle to its diameter; an c. arranging said free rotor freely rotatable in said conduit.

20. The method of claim 19, said step of providing at least one free rotor comprising the step of providing at least two free rotors.

21. The method of claim 20, further comprising the step of arranging two adjacent of said free rotors to rotate in the same direction as each other.

22. The method of claim 20, further comprising the step of arranging two adjacent of said free rotors to rotate in opposite directions from each other.

* * * * *